United States Patent
Klendworth et al.

(10) Patent No.: US 7,402,546 B2
(45) Date of Patent: Jul. 22, 2008

(54) MAGNESIUM CHLORIDE SUPPORT

(75) Inventors: Douglas D. Klendworth, West Chester, OH (US); Mark K. Reinking, Mason, OH (US); Edward D. Kist, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 222 days.

(21) Appl. No.: 10/947,721

(22) Filed: Sep. 23, 2004

(65) Prior Publication Data

US 2006/0063664 A1    Mar. 23, 2006

(51) Int. Cl.
- *B01J 31/00* (2006.01)
- *B01J 27/06* (2006.01)
- *C08F 4/60* (2006.01)
- *C08F 4/44* (2006.01)

(52) U.S. Cl. .................. 502/169; 502/224; 502/226; 502/227; 502/229; 502/231; 502/103; 502/115; 502/117; 428/403

(58) Field of Classification Search .......... 502/169, 502/172, 224, 226, 103, 115, 117, 227, 229, 502/231; 977/775; 428/403
See application file for complete search history.

(56) References Cited

U.S. PATENT DOCUMENTS

| | | | | |
|---|---|---|---|---|
| 3,953,574 A | * | 4/1976 | Toomey | 423/178 |
| 4,076,602 A | * | 2/1978 | Wheeler | 205/404 |
| 4,228,144 A | * | 10/1980 | Kono et al. | 423/498 |
| 4,421,674 A | | 12/1983 | Invernizzi et al. | 502/154 |
| 4,483,938 A | | 11/1984 | Rees | 502/113 |
| 4,752,597 A | | 6/1988 | Turner | 502/104 |
| 4,791,180 A | | 12/1988 | Turner | 526/160 |
| 5,064,802 A | | 11/1991 | Stevens et al. | 502/155 |
| 5,173,465 A | | 12/1992 | Luciani et al. | 502/107 |
| 5,539,124 A | | 7/1996 | Etherton et al. | 548/402 |
| 5,554,775 A | | 9/1996 | Krishnamurti et al. | 556/7 |
| 5,637,660 A | | 6/1997 | Nagy et al. | 526/160 |
| 5,902,866 A | | 5/1999 | Nagy et al. | 526/133 |
| 6,020,279 A | * | 2/2000 | Uwai et al. | 502/9 |
| 6,232,260 B1 | | 5/2001 | Nagy et al. | 502/155 |
| 7,071,137 B2 | * | 7/2006 | Klendworth et al. | 502/103 |
| 2004/0229748 A1 | | 11/2004 | Chen et al. | 502/118 |

FOREIGN PATENT DOCUMENTS

| | | |
|---|---|---|
| EP | 0222504 | 5/1987 |
| EP | 0654444 | 5/1995 |

OTHER PUBLICATIONS

Mishakov, et al., "Nanocrystalline MgO As A Dehydrohalogenation Catalyst", *Journal of Catalysis*, 206, 40-48 (2002).
N. Kubota et al., *Powder Technology 121* (2001) 31.

* cited by examiner

*Primary Examiner*—Michael A Marcheschi
(74) *Attorney, Agent, or Firm*—Jonathan L. Schuchardt

(57) ABSTRACT

The invention relates to supports comprising inorganic oxide particles coated with magnesium chloride and a method for making them. The inorganic oxide has a mean particle diameter of less than 5 microns and is used as a seed to crystallize magnesium chloride from solution. The magnesium chloride-coated inorganic oxide is useful for supporting transition metal compounds; the supported transition metal compounds are used as catalysts for polymerizing olefins.

9 Claims, No Drawings

MAGNESIUM CHLORIDE SUPPORT

FIELD OF THE INVENTION

The invention relates to a support for olefin polymerizations and a method of making the support.

BACKGROUND OF THE INVENTION

Interest in catalysis continues to grow in the polyolefin industry. There are several known processes to polymerize olefins including solution, slurry, and gas phase processes. For some processes, it is preferred to use a solid catalyst and one common strategy is to support a transition metal compound on magnesium chloride. The surface area affects the availability of the transition metal compound and therefore the activity of the catalyst. The greater the activity of the catalyst, the less the residual transition metal which is left in the polyolefin. High levels of residual transition metal can have adverse effects on such properties as color and thermal stability.

There have been several approaches to obtaining magnesium chloride with high surface area. For example, U.S. Pat. No. 4,421,674 discloses a spray drying method and compares it with several other methods. They are able to prepare small particle size magnesium chloride by heating a concentrated solution of magnesium chloride in ethanol and spray drying the solution with a stream of hot nitrogen. Spray drying has advantages versus other techniques that can give low particle size such as milling. Unfortunately, milling yields irregular particles. When these particles are treated with titanium tetrachloride, the catalysts have lower activity than titanium tetrachloride supported on spray-dried magnesium chloride.

The '674 patent also teaches to dissolve commercially available flake magnesium chloride with an average particle size of from 0.1 to 2 mm in anhydrous ethanol and heat to concentrate the solution. The magnesium chloride precipitates as elongated needles with an average size of 30 microns. This is treated with titanium tetrachloride, but again gives poorer results than those obtained by using spray-dried magnesium chloride. Spray drying requires extra equipment and it would be desirable to have a simpler process.

Further, as noted in U.S. Pat. No. 5,173,465, there are difficulties and complications inherent in the spray drying operation. They attempt to overcome these difficulties by impregnating porous silica having a mean particle size of between 10 and 100 microns. The silica is slurried in an ethanol solution of magnesium chloride to impregnate the porous silica and then the slurry is heated to remove the ethanol to a level of between 1.5 to 4 moles ethanol per mole magnesium chloride. The silica represents 50-90% by weight of the solid catalyst component with the remaining 50-10% containing titanium, magnesium, chlorine, and alkoxy groups. Even at 50%, this doubles the weight of solid that must be added to the polymerization.

It would be desirable to have a particle of magnesium chloride that can be used as a support for transition metal compounds to form highly active catalysts without the difficulties associated with spray drying and without using high levels of silica having a large particle size.

There has been considerable work with other systems regarding crystal size. Much of the work involves ensuring a large uniform crystal. One technique used to influence crystal size is to seed a supersaturated solution. The crystallization of potassium alum, $KAl(SO_4)_2 \cdot 12H_2O$, has been studied extensively by Kubota et al, as reported in *Powder Technology* 121 (2001) 31. They state that while "seeding has been known for a long time as an effective technique . . . . No one can predict what amount of seeds and what size of seeds should be added into a crystallizer to produce a product of desired size, or to stabilize crystallization. No methodology has been proposed. Seeding seems to be treated as an art."

In the study of potassium alum, Kubota made two key findings. There is a critical seed concentration. Above that seed concentration, the crystals of potassium alum were unimodal in size distribution and bimodal below that concentration. Also, the mean size of the potassium alum crystals increased linearly with the mean mass size of the seeds. The sizes of the seeds studied were from 40 microns to 300 microns.

Magnesium chloride has been used for more than 20 years and the concept of seeding to influence crystallization has been known for more than 100 years. However, there remains a need to make magnesium chloride of uniform and small particle size without the complications of spray drying.

SUMMARY OF THE INVENTION

The invention relates to supports comprising inorganic oxide particles coated with magnesium chloride and a method for making them. The particles are used as seeds to crystallize magnesium chloride from solution. The magnesium chloride-coated inorganic oxide particles are useful for supporting transition metal compounds. The supported transition metal compounds can be used to catalyze olefin polymerizations.

DETAILED DESCRIPTION OF THE INVENTION

The support of the invention comprises inorganic oxide particles coated with magnesium chloride. The particles have a mean particle diameter less than 5 microns. The inorganic oxide particles preferably have a mean particle diameter of less than 1 micron, and more preferably less than 0.1 micron. The size of the inorganic oxide is a more critical parameter than the exact choice of inorganic oxide. Suitable inorganic oxides include, for example, oxides of aluminum, silicon, antimony, cerium, copper, indium, iron, titanium, tin, yttrium, and zinc. Mixtures of inorganic oxides may be used. The inorganic oxide should be insoluble in the solvent used to crystallize the magnesium chloride. Suitable inorganic oxides are commercially available from a variety of companies.

Magnesium chloride can initially be of any size or shape. Preferably, the magnesium chloride has a water content less than 10% by weight, more preferably, less than 0.5%. One preferred method of coating the inorganic oxide with magnesium chloride is to slurry the inorganic oxide in a solution of magnesium chloride dissolved in ethanol and then crystallize the magnesium chloride by cooling or concentrating the solvent. Preferably, the slurry is stirred during crystallization. Alcohols, especially ethanol, are preferred solvents. Preferably, the solvent has a water content less than 5% by weight.

After crystallization, the solid particles are separated from excess solvent by any of several techniques. One preferred technique is to filter and then vacuum-dry the solid. Optionally, drying is not exhaustive and a small amount of the solvent remains with the solid. When ethanol is used as a solvent, the drying is preferably done until from 1-6 moles of ethanol per mole magnesium chloride remain.

The weight ratio of magnesium chloride to inorganic oxide particles is preferably from about 100:1 to about 100,000:1 more preferably, from about 1,000:1 to about 10,000:1. If the weight ratio is too high, the particle size of the crystals can be variable and too large. If the weight ratio is too low, it can add to the cost unnecessarily.

The inorganic oxide particles coated with magnesium chloride can be used as a support material for an olefin polymerization catalyst. Preferably, the olefin polymerization catalyst is a metallocene, non-metallocene single-site, or Ziegler-Natta catalyst comprising a Group 4-10 transition metal compound.

Metallocene catalysts include those containing substituted and unsubstituted cyclopentadienyl, fluorenyl, or indenyl ligands, or the like, such as those described in U.S. Pat. Nos. 4,791,180 and 4,752,597, the teachings of which are incorporated herein by reference.

Non-metallocene single-site catalysts include the so-called "constrained geometry" catalysts (see, e.g., U.S. Pat. No. 5,064,802) and catalysts containing one or more heteroatomic ring ligands such as boraaryl, pyrrolyl, indolyl, indenoindolyl, quinolinyl, pyridinyl, and azaborolinyl as described in U.S. Pat. Nos. 5,554,775, 5,539,124, 5,637,660, 5,902,866, and 6,232,260, the teachings of which are incorporated herein by reference.

More preferably, the olefin polymerization catalyst is a Ziegler-Natta catalyst. They include titanium halides, titanium alkoxides, vanadium halides, and mixtures thereof, especially, $TiCl_3$, $TiCl_4$, mixtures of $VOCl_3$ with $TiCl_4$, and mixtures of $VCl_4$ with $TiCl_4$. Other suitable Ziegler-Natta catalysts appear in U.S. Pat. No. 4,483,938, the teachings of which are incorporated herein by reference, and in Eur. Pat. No. 222,504. Most preferably the olefin polymerization catalyst is $TiCl_4$.

Optionally, a Lewis base is also added to the supported transition metal compound. Preferred Lewis bases are $C_3$-$C_{24}$ esters such as butyl acetate, diethyl phthalate, trimethyl trimellitate, and diethyl adipate and $C_4$-$C_{16}$ ethers such as dibutyl ether, glyme, and diglyme. More preferred Lewis bases are $C_9$-$C_{24}$ esters such as diethyl phthalate, dioctyl isophthalate, and 1,6-hexanediol bisbenzoate.

The supported transition metal compounds are useful as olefin polymerization catalysts. The polymerization is conducted in the presence of the supported transition metal compound and an aluminum compound such as methylalumoxane, diethyl aluminum chloride, triethyl aluminum, and triisobutyl aluminum.

Preferably, the transition metal compound is a Ziegler-Natta catalyst and the aluminum compound is a dialkyl aluminum halide or a trialkyl aluminum compound.

Preferably, the olefin is an alpha-olefin. More preferably, the olefin is selected from the group consisting of ethylene, propylene, 1-butene, 1-hexene, 1-octene, and mixtures thereof. Most preferably, the olefin is ethylene or ethylene with a second olefin.

The following examples merely illustrate the invention. Those skilled in the art will recognize many variations that are within the spirit of the invention and scope of the claims.

EXAMPLE 1

Magnesium chloride powder, (100 g; water content <5%; available from Aldrich Chemical Company) is dissolved under nitrogen in 1.5 L of anhydrous ethanol at 70° C. with stirring. Aluminum oxide (0.01 g) with an average particle size of 47 nm (0.047 microns) (available from Nanophase Technologies Corporation) is added with continued stirring. The slurry is concentrated with slight vacuum while maintaining the temperature at 70° C. to a volume of 500 mL to begin crystallization. The mixture is cooled to room temperature to obtain more crystals. The magnesium chloride coated on aluminum oxide is filtered and dried for 1 hour at 40° C. under vacuum. The particles are expected to be uniform and to have a large surface area.

EXAMPLE 2

The magnesium chloride coated on inorganic oxide prepared in Example 1 (1 g) is placed in a glass tube and exposed to a stream of titanium tetrachloride in nitrogen for 2 hours to support the titanium tetrachloride. A 2-L stainless steel polymerization reactor is pressure purged with dry nitrogen three times at 70° C. After completely venting the reactor, hydrogen is added as a 1.7 MPa pressure drop from a 7-mL vessel. A solution of 1-hexene (100 mL) and triisobutyl aluminum (1 mmol) in isobutane (1 L) is added to the reactor followed by the supported titanium tetrachloride. Ethylene is added to give a total reactor pressure of 2.4 MPa. Temperature is maintained at 70° C. and ethylene pressure is fed on demand to maintain 2.4 MPa for 30 minutes. After 30 minutes of polymerization, the reactor is vented to remove the volatiles. A copolymer of ethylene with hexene is the expected reaction product.

The preceding examples are meant only as illustrations. The following claims define the invention.

We claim:

1. A support comprising inorganic oxide particles coated with magnesium chloride wherein the particles have a mean diameter less than 5 microns and the weight ratio of magnesium chloride to inorganic oxide is from about 1,000:1 to about 100,000:1.

2. The support of claim 1 wherein the particles have a mean particle diameter of less than 1 micron.

3. The support of claim 2 wherein the particles have a mean particle diameter of less than 0.1 micron.

4. The support of claim 1 wherein the weight ratio of magnesium chloride to inorganic oxide is from about 1,000:1 to about 10,000:1.

5. The support of claim 1 further comprising ethanol.

6. The support of claim 1 wherein the inorganic oxide is selected from the group consisting of oxides of aluminum, antimony, cerium, copper, indium, iron, silicon, tin, titanium, yttrium, zinc, and mixtures thereof.

7. A method which comprises crystallizing magnesium chloride in the presence of inorganic oxide particles having a mean diameter less than 5 microns to produce the support of claim 1.

8. The method of claim 7 wherein the crystallization is performed in the presence of an alcohol solvent.

9. The method of claim 8 wherein the solvent is ethanol.

* * * * *